United States Patent
Wallen

(10) Patent No.: US 10,099,407 B2
(45) Date of Patent: Oct. 16, 2018

(54) COATINGS AND FILMS AS MANDREL SEALER

(71) Applicant: Matt Wallen, Vail, AZ (US)

(72) Inventor: Matt Wallen, Vail, AZ (US)

( * ) Notice: Subject to any disclaimer, the term of this patent is extended or adjusted under 35 U.S.C. 154(b) by 266 days.

(21) Appl. No.: 14/716,855

(22) Filed: May 19, 2015

(65) Prior Publication Data

US 2016/0158973 A1 Jun. 9, 2016

Related U.S. Application Data

(60) Provisional application No. 62/001,034, filed on May 20, 2014.

(51) Int. Cl.
| | |
|---|---|
| *B29C 41/20* | (2006.01) |
| *B29C 33/62* | (2006.01) |
| *B29C 41/02* | (2006.01) |
| *B29C 53/82* | (2006.01) |
| *B29C 35/02* | (2006.01) |
| *B29C 70/30* | (2006.01) |
| *B29C 70/46* | (2006.01) |
| *B29C 33/56* | (2006.01) |
| B29K 27/18 | (2006.01) |
| B29K 86/00 | (2006.01) |
| B29L 9/00 | (2006.01) |
| *B29C 70/34* | (2006.01) |
| *B29C 41/00* | (2006.01) |
| *B29C 41/08* | (2006.01) |
| *B29C 41/14* | (2006.01) |

(52) U.S. Cl.
CPC .............. *B29C 41/20* (2013.01); *B29C 33/56* (2013.01); *B29C 33/62* (2013.01); *B29C 35/02* (2013.01); *B29C 41/025* (2013.01); *B29C 53/82* (2013.01); *B29C 53/824* (2013.01); *B29C 70/30* (2013.01); *B29C 70/462* (2013.01); *B29C 41/003* (2013.01); *B29C 41/08* (2013.01); *B29C 41/14* (2013.01); *B29C 70/345* (2013.01); *B29K 2011/00* (2013.01); *B29K 2027/18* (2013.01); *B29K 2086/00* (2013.01); *B29K 2839/06* (2013.01); *B29L 2009/005* (2013.01)

(58) Field of Classification Search
CPC ....... B29C 41/20; B29C 41/22; B29C 41/003; B29C 41/025; B29C 41/08; B29C 53/82; B29C 53/824; B29C 33/56; B29C 33/62; B29C 33/60; B29C 70/30; B29C 70/462; B29C 70/345; B29C 35/02; B29K 2839/06

See application file for complete search history.

(56) References Cited

U.S. PATENT DOCUMENTS

| | | | | |
|---|---|---|---|---|
| 5,173,332 A | * | 12/1992 | Pastureau | B29O 33/3842 264/29.5 |
| 2012/0228467 A1 | * | 9/2012 | Wallen | B28B 7/346 249/61 |
| 2014/0017557 A1 | * | 1/2014 | Lockett | H01M 2/164 429/189 |

FOREIGN PATENT DOCUMENTS

EP 116453 * 8/1984

* cited by examiner

*Primary Examiner* — Yogendra N Gupta
*Assistant Examiner* — Ninh Le
(74) *Attorney, Agent, or Firm* — David Lucas

(57) ABSTRACT

It is sometimes advantageous to coat or seal the mandrel before laying on, coating, or wrapping the mandrel with composite plastic material. This invention provides improved coating with improved function that is easily removable from the cured product. The effective coating materials are applied directly to the mandrel as a coat or as a film or tape. Thermally expandable coat or film also reduces manufacturing costs for composite plastic products.

1 Claim, No Drawings

COATINGS AND FILMS AS MANDREL SEALER

RELATED APPLICATIONS

This application claims the benefits of U.S. Provisional Application 62/001,034, filed May 20, 2014.

BACKGROUND OF THE INVENTION

Composite plastic parts are of great value in industry because of their high strength and light weight. Tubular, simple, and complex structures are produced by laying on, wrapping, or coating a core mold, or mandrel, with the composite plastic and curing the composite at appropriately high temperature.

Multiple problems arise, however, in creating a core mold of sufficient strength, appropriate surface characteristics, compatibility with the composite and the curing process, and ease of removing the core from the cured composite structure without damage to the composite or significant additional cost.

Core molds, or mandrels, have been made with sand and binders, plaster, plaster mixed with various binders, fillers such as cenospheres or graphite, and other materials.

It is sometimes advantageous to apply a coating or sealer on the mandrel prior to laying on, coating, or wrapping the mandrel with the raw composite material. However, there are problems with currently used coatings, including their becoming brittle and/or difficult to remove completely from the cured product.

SUMMARY OF THE INVENTION

Improved sealers applied to the mandrel prior to coating or wrapping the mandrel with raw composite plastic are easily removable from the cured composite product and produce higher quality composite products. Further, the utilization of expandable coating as sealer reduces the time and energy required for the curing process. The effective materials of such sealers are applied to a mandrel directly as a coating or as a film or tape.

Applying the easily removable sealer, coating, film, or tape to an easily removable mandrel for the manufacture of a composite product results in a superior product from which the mandrel and sealer are easily removed, as described herein.

DESCRIPTION OF THE INVENTION

Neoprene-based Mandrel Sealing System

Neoprene-based coating overcomes the difficulties and disadvantages of currently used coatings. This coating can be applied to a mandrel as a spray or dip. The addition of an effective amount of polytetrafluoroethylene (PTFE) to neoprene, followed by curing, creates a self-releasing surface of the coating. Adding an effective amount of polyvinylpyrrolidone, for example KV30-PVP, to neoprene creates a hardened surface for the coating when dehydrated. This coating is completely removable from the cured composite plastic product with water.

All examples are for illustration and not intended to be limiting.

As an example of neoprene with PTFE, Laurel Products Ultraflon ad10 is added to Chemionics dippable neoprene at about 30% by weight. This mixture is sprayed or the mandrel is dipped to coat the mandrel.

As an example of neoprene with polyvinylpyrrolidone (PVP), PVP K-30 is dispersed into a 30% by weight solution in water and Chemionics dippable neoprene is added at a ratio of 30 grams neoprene to 70 grams of the PVP K-30 solution. This mixture is sprayed on the mandrel and dehydrated or cured. Other molecular weights of PVP can be used, but much higher molecular weight PVP increases the viscosity so it is difficult to spray, but can be used to dip. Composite material is then laid on, wrapped, or coated on the mandrel. The composite is cured in a way appropriate to the composite and the mandrel and coating are easily removed from the finished composite product.

Thermally Expandable Coatings

A thermally expandable coating on a mandrel can be used in combination with a closed external mold. This is an internal thermally-induced pressurized system. The expansion temperature is that temperature at which the utilized thermally-expandable component in the coating, sealer, film, or tape expands.

As an example of thermally expandable coating, Azkonobel Expancel DU031 is mixed with PVP K-30 30% solution. Expancel is dispersed into a liquid solution using a surfactant such as Surfynol 485 in the range of about 1-6% surfactant to 50% by weight Expancel in water. This dispersed expansion media is then mixed into the 30% PVP K30 solution at about 1-10% PVP solution to 90-99% Expancel dispersion. This mixed coating is applied to a mandrel. The coating is dehydrated at less than 65° C. so as not to activate the expansion coating. The dehydrated coating is then coated with a flexible coating such as base neoprene or other flexible coating and cured again at low temperature, if needed. The part is then coated or wrapped with raw composite plastic and placed into a closed external mold. This is then heated above the expansion temperature and to appropriate curing conditions for the composite plastic. The thermally-induced expansion of the coating presses outward from the mandrel surface forcing the uncured composite onto the inner surface of the outer mold cavity. After taking the shape of the mold and curing, the composite and tool are all brought to room temperature and the part is ready to be removed from the mold. The entire part (mandrel and composite) is placed into a bath for disintegrating the mandrel. After removing the mandrel the neoprene is simply pulled from the composite producing a hollow continuous fiber, high tolerance article. This method eliminates the necessity for an autoclave, vacuum pumps, bagging materials, release, breather, and also reduces scrap rate as the many of outer bag cured parts, using prior technology, are scrapped due to wrinkle formation or composite movement during vacuum autoclave curing. This technique is good over a range of temperatures that can be tuned to the necessary pressurization curve and temperature defined by the composite system by selecting different grades of Expancel utilized at an effective concentration. Temperature ranges covered by this technique are from 70° C. to 220° C. cure cycles.

High Temperature Thermally Expandable Coating

In the same general embodiment of the above, Expancel-based expansion coating system, expansion in excess of 200° C. is difficult, and the pressure exertion duration is short or the material melts too fast to exert pressure. To overcome this limitation, thermally expandable graphite is utilized at an effective concentration. In particular, intercalated graphite expands by separating individual layers of graphite from the bulk graphite flake resulting in a significant volumetric expansion and therefore pressure exertion on any surrounding material, much like the Expancel material utilized in the above embodiment. The invention relates to utilizing expandable graphite (such as Asbury Carbon) dispersed into aqueous solution near 50% with 1-10% surfactant to produce dispersed graphite. To bind the graphite coating, any of several binders can be utilized, from PVP to methacrylates to neoprene for lower temperature applications, and polyimide, Kapton, silicone, or rubber can be used for higher temperature, or even soluble silicates can be used. The majority of the binder ultimately will be destroyed upon heating to such high temperatures, but will allow the coating to survive the layup process, etc. before expanding.

In another embodiment of the invention, the expandable graphite is mixed with a high temperature matrix such as silicone to produce a flexible film that can be applied to any surface that needs to exert pressure from the expansion of the film during thermally processing. Just as the coating discussed above is able to produce pressure upon exfoliation of the contained expandable graphite, the film with contained expandable graphite is able to increase in size upon the application of sufficient heat. The film can be produced as a controlled thickness film with or without adhesive.

The mandrel is subsequently wrapped or coated with raw composite plastic and placed into a closed external mold. The assembly is heated above the expansion temperature of the utilized expandable graphite and cured appropriate to conditions needed to cure the composite.

The advantage to the utilization of an expandable surface coating, as opposed to an expandable mandrel, is that all of these systems require the thermal energy utilized for expansion to originate from the outer mold and pass through the composite and ultimately either into the mandrel or in this case just into the mandrel coating. As the heat flux into the system defines the overall rate of the process, a reduction in the amount of energy needed to input into the system is directly a reduction in the amount of time for processing. As the coating is on the surface of the mandrel it will expand well before the material in the center of the insulating core of the mandrel and as such will significantly reduce the processing time and provides a great advantage.

Examples are intended to illustrate the invention and are not limiting.

Thermally Expandable Films/Tapes

As an alternative to applying direct spray-on or dip coatings onto the unsealed mandrel, pre-fabricated films or tapes can also be produced and utilized by applying/laying up onto to the mandrel prior to the composite layup. These films/tapes are equally thermally activated like the spray-on/dipped coatings and apply, therefore, similar pressure on the laid up composite matrix when heated. The films are produced by utilization of different carriers such as PTFE, Silicon, PVA, neoprene, latex or others to hold the desired effective charge of expandable materials. Expandable materials can range from low temperature (up to 400° F.) activated to high temperature (over 800° F.) activated materials.

Many other variations of this invention will be understood by those skilled in the art.

What is claimed:

1. The method of manufacturing a composite product comprised of steps: a. coating a mandrel with a neoprene mixture comprised of neoprene mixed with polyvinylpyrrolidone that creates a hardened, self-releasing surface on said neoprene mixture when dehydrated, b. dehydrating said coating of neoprene mixture, c. laying on, coating or wrapping said coated mandrel with composite plastic, d. curing the composite plastic; and wherein the neoprene mixture comprised of 30 weight percent solution of polyvinylpyrrolidone in water and neoprene is added at a ratio of 30 grams of neoprene to 70 grams of polyvinylpyrrolidone.

* * * * *